(12) United States Patent
Qiu et al.

(10) Patent No.: US 9,159,340 B1
(45) Date of Patent: Oct. 13, 2015

(54) COIL STRUCTURE FOR WRITE HEAD

(71) Applicant: Seagate Technology LLC, Cupertino, CA (US)

(72) Inventors: Jiaoming Qiu, Maple Grove, MN (US); Jianhua Xue, Maple Grove, MN (US); Kevin Heim, Eden Prairie, MN (US); Kirill Rivkin, Edina, MN (US); Huaqing Yin, Eden Prairie, MN (US); John Wolf, Maple Grove, MN (US); Yonghua Chen, Bloomington, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/471,933

(22) Filed: Aug. 28, 2014

(51) Int. Cl.
*G11B 5/17* (2006.01)
*G11B 5/31* (2006.01)

(52) U.S. Cl.
CPC . *G11B 5/17* (2013.01); *G11B 5/313* (2013.01)

(58) Field of Classification Search
CPC .......... G11B 5/17; G11B 5/313; G11B 5/127
USPC .............. 360/123.01–123.06, 123.1, 123.13, 360/123.14, 123.19, 123.36, 123.57
See application file for complete search history.

(56) References Cited

U.S. PATENT DOCUMENTS

| | | | |
|---|---|---|---|
| 3,891,995 A * | 6/1975 | Hanazono et al. | 360/123.01 |
| 4,631,612 A | 12/1986 | Shiiki et al. | |
| 4,652,957 A * | 3/1987 | Schewe et al. | 360/125.02 |
| 4,675,766 A * | 6/1987 | Schewe | 360/123.11 |
| 4,703,382 A * | 10/1987 | Schewe et al. | 360/123.11 |
| 6,038,106 A | 3/2000 | Aboaf et al. | |
| 6,195,233 B1 | 2/2001 | Akiyama et al. | |
| 6,798,615 B1 * | 9/2004 | Litvinov et al. | 360/125.17 |
| 6,954,331 B2 * | 10/2005 | Crawford et al. | 360/125.3 |
| 6,984,333 B2 | 1/2006 | Matono et al. | |
| 7,394,621 B2 | 7/2008 | Li et al. | |
| 7,515,381 B2 | 4/2009 | Baer et al. | |
| 7,656,612 B2 | 2/2010 | Sasaki et al. | |
| 7,672,079 B2 | 3/2010 | Li et al. | |
| 7,679,862 B2 | 3/2010 | Nakamoto et al. | |
| 8,004,792 B2 * | 8/2011 | Biskeborn et al. | 360/123.56 |
| 8,035,922 B2 * | 10/2011 | Lille et al. | 360/123.06 |
| 8,054,580 B2 | 11/2011 | Kimura et al. | |
| 8,107,191 B2 | 1/2012 | Im et al. | |
| 8,125,732 B2 | 2/2012 | Bai et al. | |
| 8,179,636 B1 | 5/2012 | Bai et al. | |
| 8,218,263 B2 | 7/2012 | Allen et al. | |

(Continued)

FOREIGN PATENT DOCUMENTS

JP 62165718 A * 7/1987
JP 02130710 A * 5/1990
JP 2628854 B2 * 7/1997

OTHER PUBLICATIONS

English-machine translation of JP 2628854 B2 to Nakamura et al., published on Jul. 9, 1997.*

(Continued)

*Primary Examiner* — Will J Klimowicz
(74) *Attorney, Agent, or Firm* — HolzerIPLaw, PC

(57) ABSTRACT

A write head having a main pole having a pole tip, the main pole having a leading side and a trailing side; and a coil structure around the main pole, the coil structure having no more than two active turns on the trailing side. A non-active, or dummy turn, may be present.

18 Claims, 4 Drawing Sheets

(56) References Cited

U.S. PATENT DOCUMENTS

| | | | |
|---|---|---|---|
| 8,264,792 B2* | 9/2012 | Bai et al. | 360/125.15 |
| 8,339,736 B2* | 12/2012 | Gao et al. | 360/123.06 |
| 8,345,384 B1 | 1/2013 | Sasaki et al. | |
| 8,405,930 B1 | 3/2013 | Li et al. | |
| 8,416,528 B1* | 4/2013 | Sasaki et al. | 360/125.02 |
| 8,472,135 B1 | 6/2013 | Kusukawa et al. | |
| 8,537,494 B1 | 9/2013 | Pan et al. | |
| 8,547,659 B1 | 10/2013 | Bai et al. | |
| 8,582,236 B2* | 11/2013 | Linville et al. | 360/125.3 |
| 8,593,761 B1 | 11/2013 | Liu et al. | |
| 8,605,386 B1 | 12/2013 | Ohtake et al. | |
| 8,649,125 B1 | 2/2014 | Basu et al. | |
| 8,665,561 B1 | 3/2014 | Knutson et al. | |
| 8,687,318 B2 | 4/2014 | Meloche et al. | |
| 8,749,919 B2 | 6/2014 | Sasaki et al. | |
| 8,786,983 B1 | 7/2014 | Liu et al. | |
| 8,804,280 B2* | 8/2014 | Lopusnik et al. | 360/110 |
| 8,817,418 B1* | 8/2014 | Matsuo et al. | 360/125.02 |
| 8,842,387 B1 | 9/2014 | Horide et al. | |
| 8,879,208 B1 | 11/2014 | Liu et al. | |
| 8,917,480 B2* | 12/2014 | Liu et al. | 360/125.09 |
| 2002/0071208 A1 | 6/2002 | Batra et al. | |
| 2002/0135943 A1 | 9/2002 | Nishizawa et al. | |
| 2004/0047079 A1 | 3/2004 | Ito et al. | |
| 2004/0169958 A1 | 9/2004 | Krounbi et al. | |
| 2006/0002021 A1 | 1/2006 | Li et al. | |
| 2008/0231994 A1 | 9/2008 | Kimura et al. | |
| 2008/0316631 A1* | 12/2008 | Gao et al. | 360/55 |
| 2008/0316643 A1* | 12/2008 | Linville et al. | 360/110 |
| 2012/0050915 A1 | 3/2012 | Hong et al. | |
| 2012/0147503 A1 | 6/2012 | Zou et al. | |
| 2012/0170154 A1* | 7/2012 | Sasaki et al. | 360/245.3 |
| 2013/0003226 A1 | 1/2013 | Bai et al. | |
| 2013/0242432 A1* | 9/2013 | Meloche et al. | 360/123.05 |
| 2014/0307348 A1 | 10/2014 | Min et al. | |
| 2014/0313614 A1 | 10/2014 | Hsiao et al. | |

OTHER PUBLICATIONS

Non-final Office Action dated Nov. 19, 2014 from U.S. Appl. No. 14/471,892, filed Aug. 28, 2014.

* cited by examiner

COIL STRUCTURE FOR WRITE HEAD

BACKGROUND

A disc drive is an example of a data storage system that uses magnetic fields for writing and reading data. Transducers write information to and read information from data surfaces of the discs. In one example, transducers include a recording or write head for generating a magnetic field that aligns the magnetic moments of a magnetic medium to represent desired bits of data. Magnetic recording heads include both longitudinal and perpendicular recording techniques. Perpendicular recording is a form of magnetic recording in which magnetic moments representing bits of data are oriented perpendicularly to the surface of the recording layer. Perpendicular magnetic write heads typically include main and return poles that are separated to form a write gap and extend from pole tips located at an air-bearing surface (ABS) to a back gap region. A coil is included to generate magnetic flux through the main and return poles in response to a current conducted through the coil. The main pole tip focuses the magnetic flux density such that the magnetic fields interact with the magnetic medium to orient its magnetic moments in an up or down direction.

As the desire for higher data rate and higher data density increases in magnetic memory storage, great challenges are placed on magnetic write head design.

SUMMARY

Implementations described and claimed herein provide a write head comprising a write pole and a coil structure around the write pole, the coil structure having two turns of the coil present on the trailing side of the write pole. In some implementations, the coil structure has two turns present on the trailing side and the leading side of the write pole.

One particular implementation is a write head comprising a main pole having a pole tip, the main pole having a leading side and a trailing side, a leading side yoke, and a coil structure having no more than two active turns on the trailing side of the main pole and no more than two active turns on the leading side of the main pole.

Another particular implementation is write head comprising a main pole having a pole tip, the main pole having a leading side and a trailing side, a leading side yoke, and a coil structure around the main pole, the coil structure consisting of two active turns on the trailing side, two active turns on the leading side, and a dummy turn on the leading side.

Yet another particular implementation is write head comprising a main pole having a pole tip proximate an air bearing surface (ABS), the main pole having a leading side and a trailing side, a leading yoke, a trailing yoke, and a coil structure around the main pole and the yokes, the coil structure having no more than two active turns on the trailing side. The write head has a core length, from the ABS to the trailing side back via, of no greater than 4 micrometers.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following detailed description.

DETAILED DESCRIPTION

Figure 1:
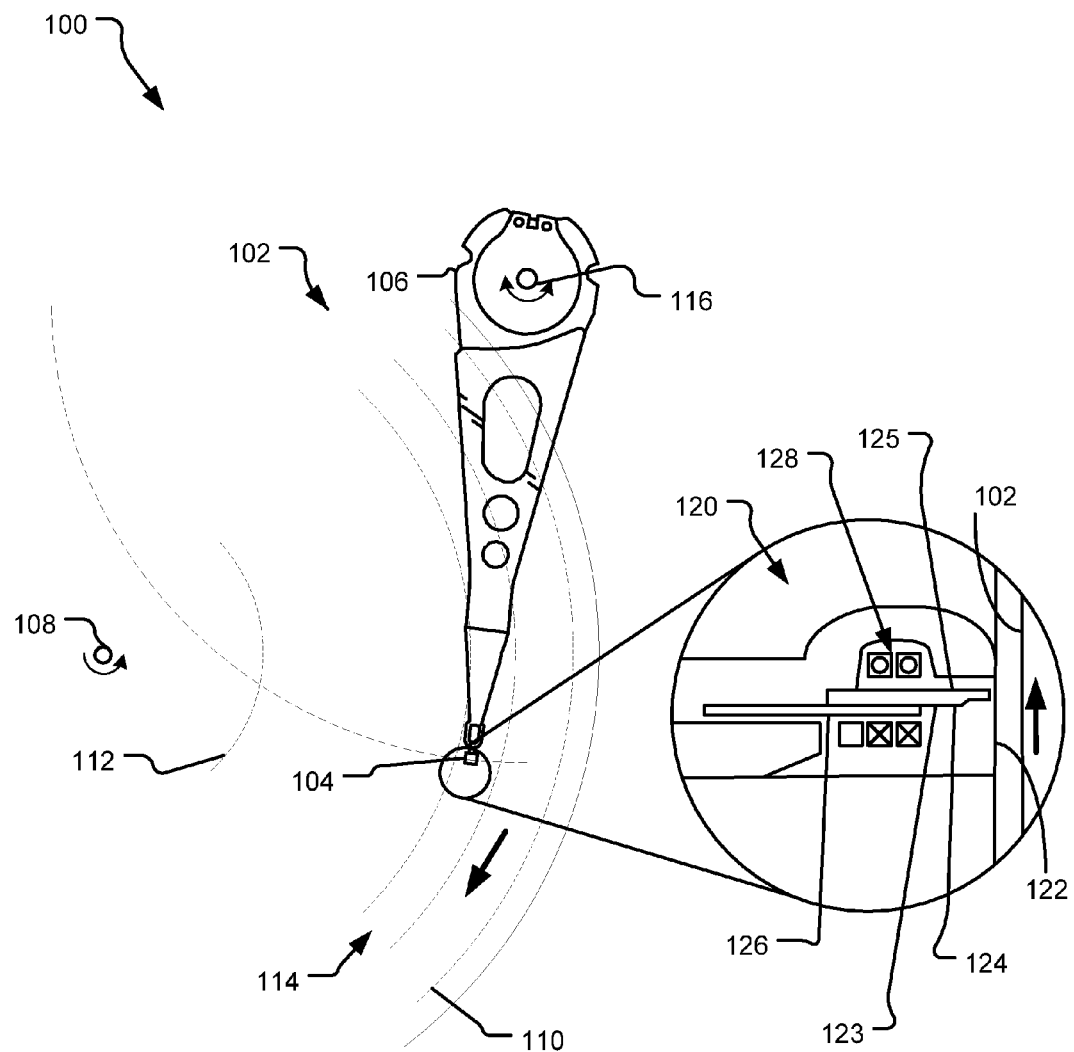
FIG. 1 is a schematic top view of storage device having an example write head implemented on an end of an actuator assembly.

As indicated above, the desire for higher data rate and higher areal density results in great challenges in designing the magnetic write head. In perpendicular recording, the write head 'writes' information into the recording media by switching the writer's magnetic field from one polarity to the other through a driving current waveform change. When recording at high data rate (HDR), the switching speed increases. Normally, the write field magnitude will be degraded and magnitude variation will be enlarged with data rate increase. These not only cause poorer media saturation, but also cause worse transition sharpness between bits. In addition, since write field bubble expansion is slower at the track edge than in the track center, the transition curvature along the cross-track direction will become larger as the data rate increases. All these HDR effects cause a poorer signal-to-noise ratio (SNR) for the recording information. The basic requirements for writer design for high areal density recording (e.g., high linear density and high track density) include providing strong writeability, confining the field in the down-track and cross-track directions, and reducing the erase field. In the push to increase track density, reducing the trailing edge physical width of the write pole tip directly helps reduce track pitch. However, with a write field of the same magnitude, reducing write pole width could cause larger track inflation and increase of the adjacent track fringing field. The large adjacent track fringing field will degrade the write field cross-track gradient and worsen the track edge erase band. This in turn will limit the track density push. Confining the field in the cross-track direction by including a side shield in the writer, for example, will improve cross-track field gradient and reduce the erase band. Thus, the track density may see a big improvement. However, a reliability issue is during transition writing; magnetization's dynamic activity in a side shield will cause a side track erasure field that will ruin the recording information in side tracks.

The present disclosure provides writer designs, or write head designs, that can significantly increase the write speed (e.g., faster switching) and improve driving current-write field efficiency, thus benefiting HDR performance. The write designs have a shorter magnetic field rise time while decreasing the coil power needed to achieve the magnetic field. The lower coil power will correspond to lower erasure field, benefiting writer's reliability.

An implementation of a recording head disclosed herein includes a two-turn coil structure around the write pole; the coil structure may be a helical coil or a planar coil. A two-turn configuration helps to reduce the total core length (i.e., the distance from the air bearing surface (ABS) to a back via), thus improving switching speed and decreasing power usages, all which improve high data rate performance. The core length is reduced by approximately 1 micrometer (approximately 20%), compared to a conventional three-turn coil. As an example, in some implementations having a two-turn coil configuration, the core length (e.g., the upper core length) is no more than about 4 micrometers, in other implementations no more than 3.6 micrometers. Particular example core lengths include 3.6 micrometers and similar lengths such as 3.5 micrometers and 3.4 micrometers.

Other implementations of this disclosure are a writer design with higher efficiency (e.g., using lower driving current to generate higher write field), a writer design with improved dynamics (to reduce write field rise-time and to improve writer's switching rate), and a writer design to reduce the erasure field and improve the writer's reliability.

In the following description, reference is made to the accompanying drawing that forms a part hereof and in which are shown by way of illustration at least one specific implementation. The following description provides additional specific implementations. It is to be understood that other implementations are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples provided below.

In some instances, a reference numeral may have an associated sub-label consisting of a lower-case letter to denote one of multiple similar components. When reference is made to a reference numeral without specification of a sub-label, the reference is intended to refer to all such multiple similar components.

FIG. 1 illustrates a storage device 100 having an example recording head structure implemented on an end of an actuator assembly. Specifically, FIG. 1 illustrates a top plan view of an implementation of a magnetic media or disc 102 with a transducer head 104 situated on an end of an actuator assembly 106. Disc 102 rotates about a disc axis of rotation 108 during operation in the direction indicated. Further, disc 102 includes an outer diameter 110 and inner diameter 112 between which are a number of data tracks 114, illustrated by dotted lines. Data tracks 114 are substantially circular and are made up of regularly spaced patterned bits.

Information may be written to and read from the patterned bits on data tracks 114 through the use of actuator assembly 106, which rotates during a data track 114 seek operation about an actuator axis of rotation 116. Transducer head 104, mounted on actuator assembly 106 at an end distal from the actuator axis of rotation 116, flies in close proximity above the surface of disc 102 during disc operation. Transducer head 104 includes a recording head including a read pole for reading data from track 114 and a write pole for writing data to track 114.

FIG. 1 also illustrates an expanded view of a partial cross-sectional configuration of transducer head 104, particularly, of a write head portion 120 of transducer head 104. Write head 120 is illustrated with its air bearing surface (ABS) 122 near magnetic media or disc 102. The direction of rotation of disc 102 is indicated in the expanded view.

Specifically, write head 120 includes a main pole 124 (also referred to as the write pole) configured to write data to disc 102 by a magnetic field. Main pole 124 is made of a ferromagnetic material such as, but not limited to, iron (Fe), cobalt (Co), nickel (Ni), and combinations thereof. For example, main pole 124 can comprise an alloy such as, but not limited to, iron and cobalt (FeCo), iron and nickel (FeNi), cobalt, iron and nickel (CoFeNi), iron and aluminum nitride (FeAlN), iron and tantalum nitride (FeTaN), cobalt, iron and boron (CoFeB), cobalt and iron nitride (CoFeN), and the like.

Main pole 124 defines a leading edge side 123 and a trailing edge side 125; leading edge side 123 engages disc 102 prior to main pole 124 engaging disc 102 as disc 102 spins, and trailing edge side 125 engages disc 102 after main pole 124 engages disc 102 as disc 102 spins. In some implementations, the features on leading edge side 123 are called the "bottom" or "lower" and the features on trailing edge side 125 are called the "top" or "upper." Write head 120 also includes a yoke 126 on the leading edge side 123. Yoke 126 facilitates switching of the magnetic flux in main pole 124 and assists in channeling the magnetic flux towards trailing edge side 125 of main pole 124. Yoke 126 is made of a high magnetic moment material, such as iron cobalt (FeCo), cobalt iron nickel (CoFeNi), and the like.

Write head 120 is energized using a coil structure 128 present around main pole 124 and yoke 126. Coil structure 128 may be a helical coil wrapped around main pole 124 and yoke 126, or coil structure 128 may be composed of planar coils present on leading edge side 123 and trailing edge side 125. Coil structure 128 is made of an electrically conductive material such as, but not limited to, copper (Cu), silver (Ag), gold (Au), and combinations thereof. Coil structure 128 generates a magnetic field to rotate the magnetization in yoke 126 and main pole 124 from behind ABS 122; the rotation or switching happens when a magnetic domain wall propagates to the ABS 122.

Coil structure 128 of write head 120 is present around main pole 124 and yoke 126, thus having a plurality of turns on leading edge side 123 and trailing side edge 125 of main pole 124. Specifically, coil structure 128 has two active turns on leading edge side 123 and on trailing edge side 123. In the illustrated implementation, a non-active or dummy turn is also present on leading edge side 123. Coil structure 128 defines a "core", which is the magnetic materials between the turns of coil structure 128; for example, when coil structure 128 is a helical coil, the core is the magnetic materials around which coil structure 128 is wound. In this illustrated implementation, write head 120 has a lower core that includes main pole 124 and yoke 126, and an upper core that includes main pole 124.

Such a write head design, having two active turns in the coil structure, at least on the trailing edge side 125 of main pole 124, reduces the total core length, thus improving high data rate performance. The configuration provides an efficient writer, reducing both magnetic rise time (the time to fully reverse saturate a pole) and erasure flux. As described above, a magnetic domain wall propagates to the ABS 122 from coil structure 128 and main pole 124. The longer the travelling distance for the magnetic domain wall, the slower the switching of the magnetic orientation. Thus, reducing the core length (defined as the distance between ABS 122 and the back via on the trailing side of the main pole) reduces the travelling distance and the magnetization complexity, so that switching speed is increased. The configuration also requires less writing power, thus providing overall electrical and thermal-mechanical improvements. It has been found that a configuration with two turns is better than a configuration with three turns, even if the same or greater area or length is used for the two turn configuration, because both the resistance and generated heat are reduced, due to the overall shorter length of the coil structure. Additional details of write head 120 are provided in below.

Figure 2:
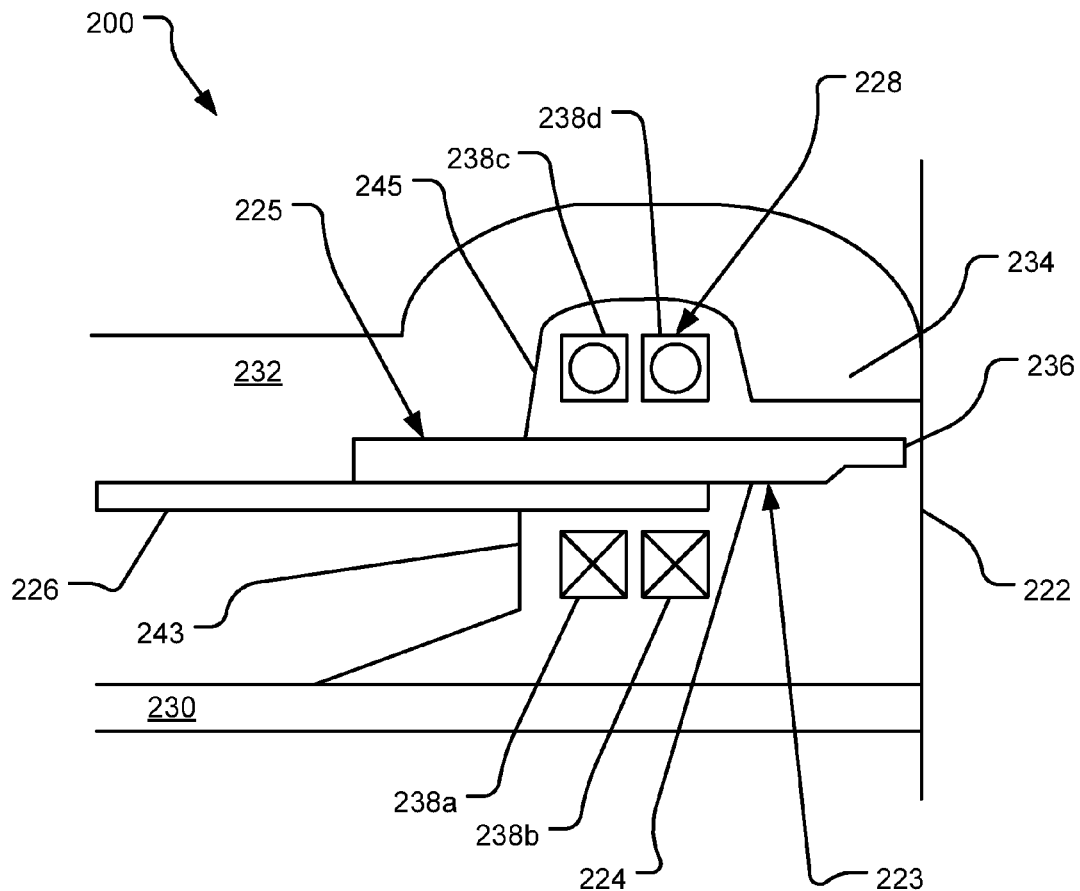
FIG. 2 is a schematic cross-sectional side view of another example write head.

FIG. 2 illustrates a more detailed view of the write head from FIG. 1. In FIG. 2, write head 200 has an air bearing surface (ABS) 222, a main pole 224 (also referred to as the write pole) defining a leading edge side 223 and a trailing edge side 225. Main pole 224 has a pole tip 236 proximate the ABS 222. On leading edge side 223 of main pole 224 is a yoke 226 recessed from pole tip 236. A coil structure 228 is present around main pole 224 and yoke 226; coil structure 228 can be a helical coil wrapped twice around main pole 224 and yoke 226, or coil structure 228 can have two sets of planar coils, one set present on leading edge side 223 and the other on trailing edge side 225.

Write head 200 has a first return pole (RP1) 230 on leading edge side 223 of pole 224 and a second return pole (RP2) 232 on trailing edge side 225 of pole 224. RP2 232 includes a front shield 234 extending towards main pole 224 at the ABS 222. A first back via 243 connects main pole 224 to RP1 230 by way of yoke 226 and a second back via 245 connects main pole 224 to RP2 232. Write head 200 has a core length measured between the ABS 222 and the trailing side back via, second back via 245.

Coil structure 228 has a plurality of turns 238, in this implementation, two turns 238a, 238b on leading edge side 223 and two turns 238c, 238d on trailing side edge 225. These turns 238 are "active" turns, in that they are configured to conduct a current, thus creating a magnetic flux. Coil structure 228 extends between main pole 224 and the leading side, RP1 230 and between main pole 224 and the trailing side, RP2 232. For example, coil structure 228 is formed as a helical coil wrapped around main pole 224. Each turn 238 of coil structure 228 is connected in series with the other turns 238 of coil structure 228. However, any suitable configuration of coil structure 228 can be utilized; for example, coil structure 228 can comprise a plurality of coils (e.g., two coils) both forming separate electric circuits. In one implementation, a dielectric or insulating material (not shown), such as alumina (Al$_2$O$_3$), electrically insulates coil structure 228 from main pole 224 and RP1 230 and from main pole 224 and RP2 232.

As a result of the current flowing through coil structure 228, a magnetic flux density is generated in main pole 224 and a magnetic flux density is generated in shield 234. The direction of the current flowing in coil structure 228 is selected such that the magnetic flux density is directed towards the ABS 222. Such magnetic flux density through the ABS into the magnetic media and may be used to cause perpendicular recording in the media.

Coil structure 228, having two active turns 238 around main pole 224, provides for a shortened core length (i.e., the distance between the ABS 222 and second back via 245) and also a shorter coil length. In some implementations, the core length is no more than about 4 micrometers, in other implementations no more than 3.6 micrometers. A particular example core length includes 3.6 micrometers.

A shorter core length allows for faster switching of the magnetic field from main pole 224, due to more efficient coil flux conducting into the paddle portion of main pole 224 or the core, and faster magnetic domain propagation in main pole 224 toward pole tip 236. Additionally, a shorter coil structure length requires less time to energize the length of the coil structure 228, because the resistance of the coil is less than for a longer coil, thus increasing the switching speed. Even with the shorter length, a two-turn coil structure 228 is sufficient to saturate main pole 224 with sufficient magnetic flux to switch the magnetic field from main pole 224.

Because coil structure 228, with two active turns 238, has a shorter length than conventional coil structures having three or more active turns, the heat generated by coil structure 228 is less than for a longer coil structure; heat can be deleterious to write head 200, not only physically or mechanically distorting the shape and size of elements of write head 200 but also affecting magnetic and/or electrical properties of write head 200. Additionally, as the number of active turns 238 and the coil length decreases, less material and processing are needed to form coil structure 228.

Because the main magnetic flux to switch main pole 224 is generated in the core, particularly on trailing side edge 225 of main pole 224, the benefits of two active turns 238, particularly on trailing side edge 225 are particularly evident.

Figure 3:
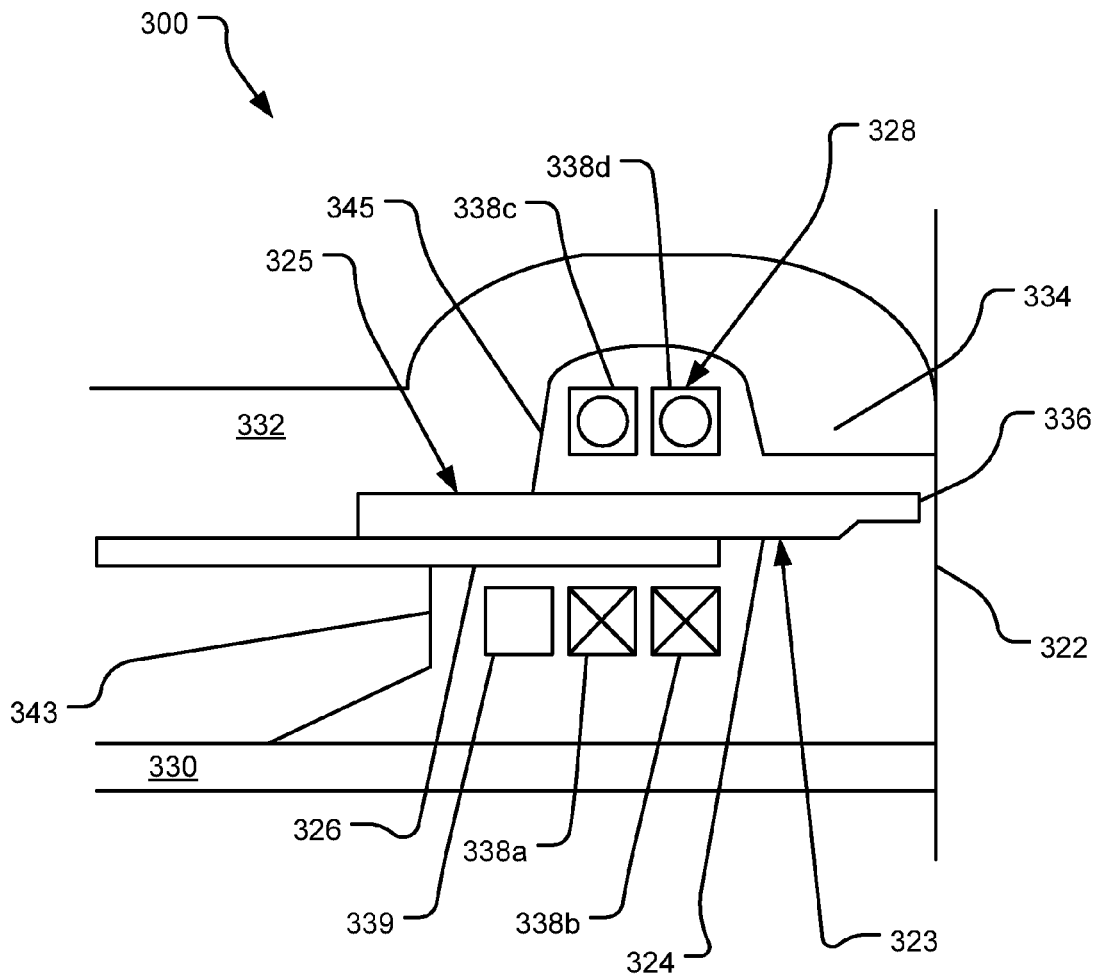
FIG. 3 is a schematic cross-sectional side view of another example write head.

FIG. 2, discussed above, illustrates a configuration of write head 200 wherein coil structure 228 is substantially symmetric around main pole 224. In some implementations, coil structure 228 on leading edge side 223 is different than coil structure 228 on trailing edge side 225 in one or more characteristics. FIG. 3 illustrates an implementation where the leading side coil structure includes more coil turns than the coil turns in the trailing side coil structure. Unless indicated otherwise, the elements of FIG. 3 are the same as or similar to like elements of FIG. 2.

In FIG. 3, write head 300 has an air bearing surface (ABS) 322, a main pole 324 defining a leading edge side 323 and a trailing edge side 325. Main pole 324 has a pole tip 336 proximate the ABS 322. On leading edge side 323 of main pole 324 is a yoke 326. A coil structure 328 is present around main pole 324 and yoke 326.

Write head 300 has a first return pole (RP1) 330 on leading edge side 323 of main pole 324 and a second return pole (RP2) 332 on trailing edge side 325 of pole 324. RP2 332 includes a front shield 334 extending towards main pole 324 at the ABS 322. A first back via 343 connects main pole 324 to RP1 330 by way of yoke 326 and a second back via 345 connects main pole 324 to RP2 332.

Coil structure 328 has a plurality of active turns 338, in this implementation, two active turns 338a, 338b on leading edge side 323 and two active turns 338c, 338d on trailing side edge 325. Coil structure 328 also includes, on leading edge side 323, a dummy turn 339, which does not conduct current. Dummy turn 339 may or may not be electrically conductive, and/or may or may not be magnetic. Dummy turn 339 may be physically connected to active turn 338a (for example, through active turn 338c) or may be physically separated from any and all active turns 338.

To reduce potential flux leakage from coil structure 328 to leading back via 343 and other bulky magnetic materials far away from the ABS 322, the distance between any active turn 338 (particularly, active turn 338a) and back via 343 is increased. Although the area between active turn 338a and back via 343 could be filled with the dielectric or insulating material (e.g., alumina) surrounding coil structure 328, dummy turn 339 is provided to fill the area with, for example, a less expensive material. In some implementations, dummy turn 339 is provided to facilitate forming (e.g., by plating, deposition, etc.) of write head 300 and its various elements.

By including one dummy turn 339, leading back via 343 is offset from trailing back via 345 (i.e., the distance from the ABS 322 to leading back via 343 is different than the distance from the ABS 322 to trailing back via 345); in other words, leading back via 343 does not coincide with trailing back via 345, and vice versa. With this offset, the opportunity exists to tune the flux path of the leading edge side 323 in relation to the trailing edge side 325 and rebalance the write flux for optimal on-track performance and reduce erasure flux.

Figure 4:
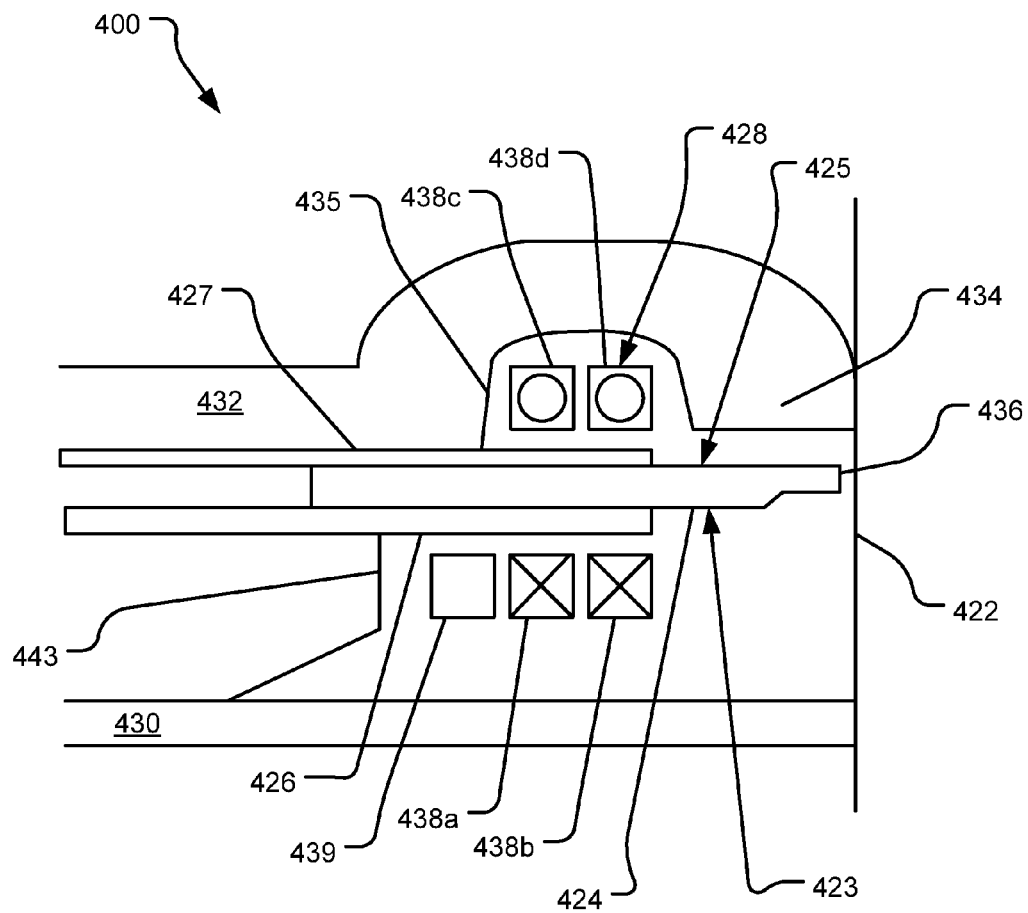
FIG. 4 is a schematic cross-sectional side view of yet another example write head.

FIG. 4 illustrates another implementation where the leading side coil structure includes more coil turns than the coil turns in the trailing side coil structure; this implementation also includes two yokes in the write head. Unless indicated otherwise, the elements of FIG. 4 are the same as or similar to like elements of FIG. 2 and FIG. 3.

In FIG. 4, a write head 400 has an air bearing surface (ABS) 422, a main pole 424 defining a leading edge side 423 and a trailing edge side 425. Main pole 424 has a pole tip 436 proximate the ABS 422. On leading edge side 423 of main pole 424 is a leading yoke 426 and on the trailing edge side 424 of main pole 424 is a trailing yoke 427. A coil structure 428 is present around main pole 424, leading yoke 426 and trailing yoke 427.

Write head 400 has a first return pole (RP1) 430 and a second return pole (RP2) 432 that includes a front shield 434 extending towards main pole 424 at the ABS 422. A first back via 443 connects main pole 424 to RP1 430 by way of leading yoke 426 and a second back via 445 connects main pole 424 to RP2 432 by way of trailing yoke 427.

Similar to the coil structure of write head 300, coil structure 428 of FIG. 4 has a plurality of active turns 438, in this implementation, two active turns 438a, 438b on leading edge side 423, two active turns 438c, 438d on trailing edge side 425, and a dummy turn 439.

All of the write heads described above, write heads 200, 300, 400 and variations thereof can be fabricated by various methods, including plating, deposition, etching, milling, and other processing techniques.

The above specification and examples provide a complete description of the structure and use of exemplary implementations of the invention. The above description provides specific implementations. It is to be understood that other implementations are contemplated and may be made without departing from the scope or spirit of the present disclosure. The above detailed description, therefore, is not to be taken in a limiting sense. While the present disclosure is not so limited, an appreciation of various aspects of the disclosure will be gained through a discussion of the examples provided.

Unless otherwise indicated, all numbers expressing feature sizes, amounts, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass implementations having plural referents, unless the content clearly dictates otherwise. As used in this specification and the appended claims, the term "or" is generally employed in its sense including "and/or" unless the content clearly dictates otherwise.

Spatially related terms, including but not limited to, "lower", "upper", "beneath", "below", "above", "on top", etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above or over those other elements.

Since many implementations of the invention can be made without departing from the spirit and scope of the invention, the invention resides in the claims hereinafter appended. Furthermore, structural features of the different implementations may be combined in yet another implementation without departing from the recited claims.

What is claimed is:

1. A write head mounted on a transducer head, the write head comprising:
   a main pole having a pole tip, the main pole having a leading side and a trailing side, the leading side closer to the transducer head than the trailing side;
   a yoke on the leading side of the main pole;
   a coil structure around the main pole and the yoke, the coil structure having no more than two active turns on the trailing side and no more than two active turns on the leading side; and
   a leading back via and a trailing back via, with the leading back via offset a greater distance from the main pole tip than the trailing back via.

2. The write head of claim 1, the coil structure further having a dummy turn on the leading side.

3. The write head of claim 1, further comprising a trailing yoke on the trailing side of the main pole and recessed from the pole tip.

4. The write head of claim 3, wherein the trailing yoke is parallel to the yoke on the leading side.

5. The write head of claim 1, wherein the coil structure is a helical coil structure.

6. The write head of claim 1, wherein the coil structure is a planar coil structure.

7. The write head of claim 1 having a core on the trailing side, the core having a length no greater than 3.6 micrometers.

8. A write head mounted on a transducer head, the write head comprising:
   a main pole having a pole tip, the main pole having a leading side and a trailing side, the leading side closer to the transducer head than the trailing side;
   a yoke on the leading side of the main pole; and
   a coil structure around the main pole, the coil structure consisting of two active turns on the trailing side, two active turns on the leading side, and a dummy turn on the leading side more distal from the pole tip than the two active turns on the leading side.

9. The write head of claim 8, further comprising a trailing yoke on the trailing side of the main pole.

10. The write head of claim 9, wherein the trailing yoke is parallel to the yoke on the leading side.

11. The write head of claim 10, wherein the trailing yoke and the yoke on the leading side are orthogonal to an air bearing surface.

12. The write head of claim 8, having a core length of no greater than 3.6 micrometers.

13. The write head of claim 8, wherein the coil structure is a helical coil structure.

14. The write head of claim 8, wherein the coil structure is a planar coil structure.

15. A write head mounted on a transducer head, the write head comprising:
   a main pole having a pole tip proximate an air bearing surface (ABS), the main pole having a leading side and a trailing side, the leading side closer to the transducer head than the trailing side;
   a leading yoke on the leading side of the main pole;
   a trailing yoke on the trailing side of the main pole;
   a coil structure around the main pole and the yokes, the coil structure having no more than two active turns on the trailing side; and
   a trailing side back via and a leading side back via;
   with the write head having a trailing core length, from the ABS to the trailing side back via, and a leading core length, from the ABS to the leading side back via, the trailing core length being no greater than 4 micrometers and being less than the leading core length.

16. The write head of claim 15, wherein the coil structure has no more than two active turns on the leading side.

17. The write head of claim 16, further comprising a dummy turn on the leading side.

18. The write head of claim 15 having a trailing core length no greater than 3.6 micrometers.

* * * * *